United States Patent [19]

De France

[11] 4,183,686
[45] Jan. 15, 1980

[54] DEAD END CONNECTOR

[75] Inventor: Robert V. De France, Poughkeepsie, N.Y.

[73] Assignee: Fargo Manufacturing Company, Inc., Poughkeepsie, N.Y.

[21] Appl. No.: 867,168

[22] Filed: Jan. 5, 1978

[51] Int. Cl.² .................................... H02G 15/00
[52] U.S. Cl. .................... 403/11; 24/135 K; 403/373
[58] Field of Search .......... 403/344, 373, 349, 11; 24/135 K, 135 R, 135 A; 174/40 R; 248/64

[56] References Cited

U.S. PATENT DOCUMENTS

| | | | |
|---|---|---|---|
| 1,268,981 | 6/1918 | Lapp | 24/135 R |
| 1,370,544 | 3/1921 | Leeper | 24/135 R |
| 2,179,516 | 11/1939 | Patrick | 403/394 |
| 3,026,077 | 3/1962 | Peterson | 248/63 |
| 3,108,344 | 10/1963 | Bethea | 403/373 |
| 3,274,654 | 9/1966 | Becker | 403/287 |

FOREIGN PATENT DOCUMENTS 1357839  3/1964  France ........................... 248/63

Primary Examiner—Andrew V. Kundrat

[57] ABSTRACT

A dead end connector for a transmission cable. The connector includes an elongated body and a cable-receiving longitudinal channel formed in the body. A pressure pad is provided with an elongated base portion which is adapted to be aligned with the longitudinal channel of the body. A cross piece is on the side of the base portion opposite to the side adjacent the channel of the body when aligned therewith and the cross piece extends across and outwardly from both sides of the aligned body and pad at an oblique angle with respect thereto. Coupling structure is provided for retaining the pressure pad in overlying aligned position with respect to the channel to hold a portion of a transmission cable therein with the cross piece enabling the provision of a holding pressure along at least a substantial portion of the engagement surface of the pressure pad with the transmission cable.

5 Claims, 10 Drawing Figures

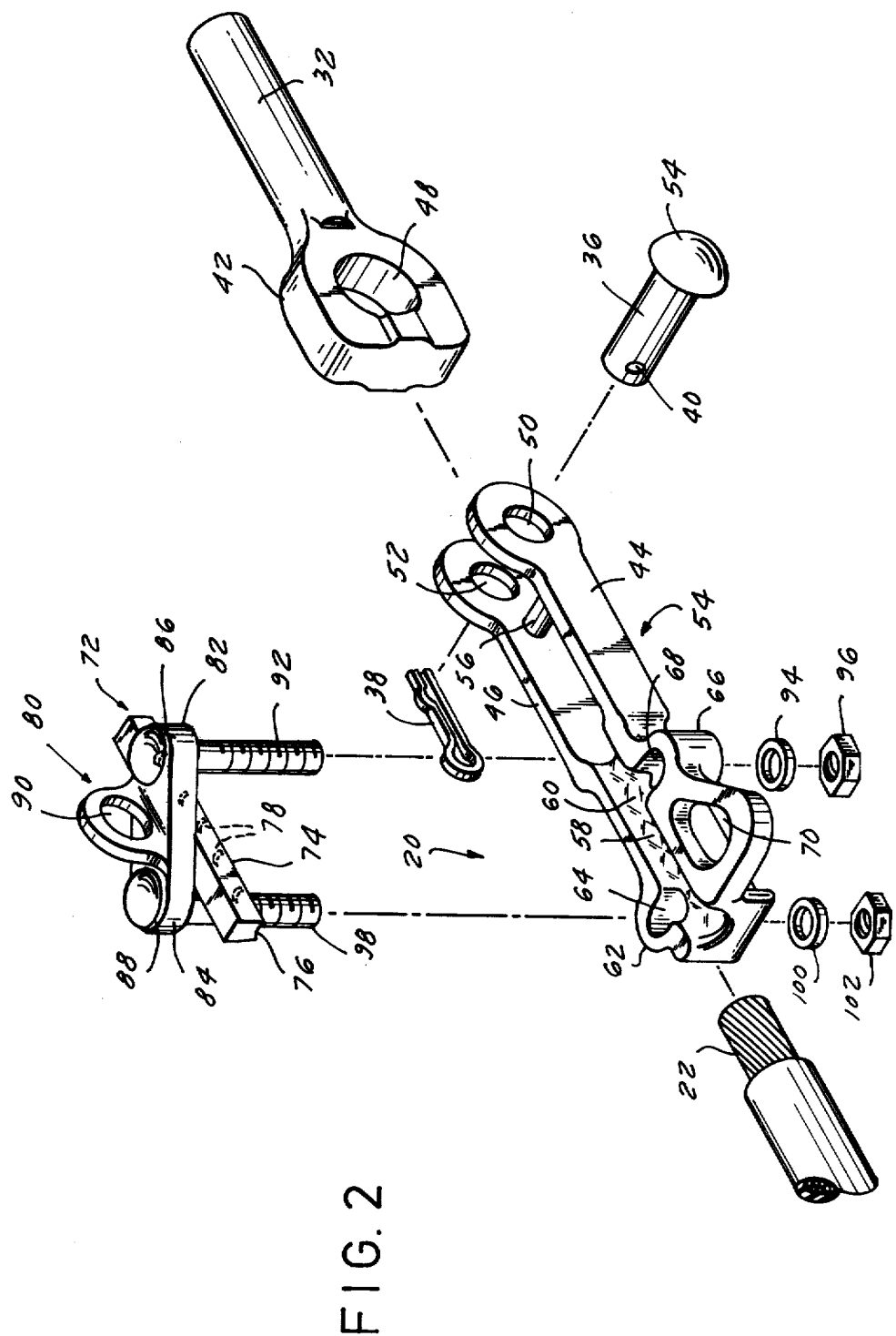

DEAD END CONNECTOR

BACKGROUND OF THE INVENTION

In dealing with electrical power transmission lines it is frequently desirable to have the ends of an electrical transmission line anchored to a supporting structure. For this purpose, couplings referred to as "dead ends" are often utilized. In general, dead ends such as those discussed and disclosed in U.S. Pat. No. 3,274,654 are conventionally employed. Naturally, in dealing with dead end connectors, it is desirable to provide the most effective connection in the least expensive and most efficient manner.

SUMMARY OF THE INVENTION

With the above background in mind, it is among the primary objectives of the present invention to provide a dead end connector for transmission cables wherein the connector is accomplished with a simple and effective structure that can be quickly and easily coupled to the cable. The connector is designed so that only two bolt assemblies are required to accomplish the fastening action. A pressure pad is provided to engage with the cable. The pressure pad engages and compresses the cable along at least a substantial portion of the full length of the engaging surface. The pad is designed so that it acts as a double cantilever and applies pressure over an entire surface area rather than on one or two specific pressure points. By being able to apply the pressure over a large area to grip the cable, a harder material can be used for the connector, such as cast alluminum, without the danger of damaging the cable.

Furthermore, the pressure pad and the receiving mating channel on the body of the connector are provided with improved gripping surfaces. For example, the pressure pad undersurface is provided with a series of spaced ribs and the receiving channel on the body mating with the pressure pad is provided with a raised waffled rib surface.

The pressure pad is arranged so that a cross piece extends obliquely to the longitudinal axis of the pad and the extending extremities of the cross piece act as cantilevers and through a movement arm effect apply a uniform pressure along the length of the pressure pad. Furthermore, only two bolt assemblies are required with each one being positioned at the extending ends of the cross piece to couple with receiving surfaces on the body to apply the force for the pressure pad along its entire length. The application of the force in this manner to the pressure pad prevents bowing of the cable when the connection is made, provides a positive load to the cable, acts as a direct pulling force on the cable and avoids any problem of misalignment of the cable when it is engaged with the dead end connector.

Furthermore the upward extending oblique cross arm provides an additional gripping surface for ease of handling of the connector when it is applied to the cable. Connection is easily accomplished with the use of only two bolt assemblies.

In summary, a dead end connector is provided for a transmission cable. The connector includes an elongated body with a cable-receiving longitudinal channel formed in the body. A pressure pad is provided and has an elongated base portion adapted to be aligned with the longitudinal channel of the body. A cross piece is on the side of the base portion opposite to the side adjacent the channel of the body when aligned therewith and the cross piece extends across and outwardly from both sides of the aligned body and pad at an oblique angle with respect thereto. Coupling means is provided for retaining the pressure pad in overlying aligned position with respect to the channel to hold a portion of a transmission cable therein with the cross piece enabling the provision of a holding pressure along at least a substantial portion of the engagement surface of the pressure pad with the transmission cable.

With the above objectives among others in mind, reference is made to the attached drawings.

BRIEF DESCRIPTION OF THE DRAWINGS

In The Drawings:

FIG. 2 is an exploded perspective view of the dead end connector of the invention;

DETAILED DESCRIPTION

Figure 1:
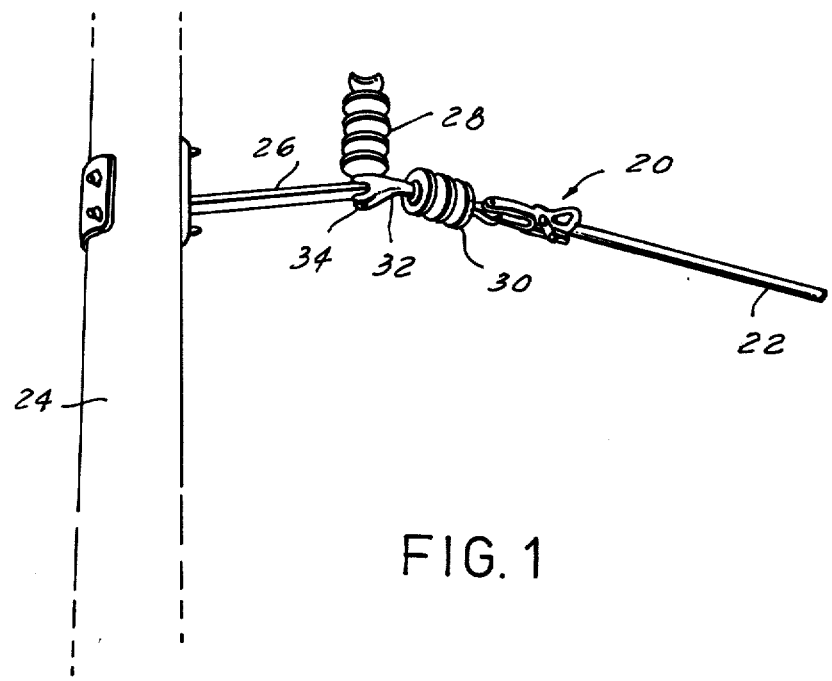
FIG. 1 is a fragmentary perspective view of the dead end connector of the invention holding a transmission cable in position in an electrical power transmission line.
Figure 5:
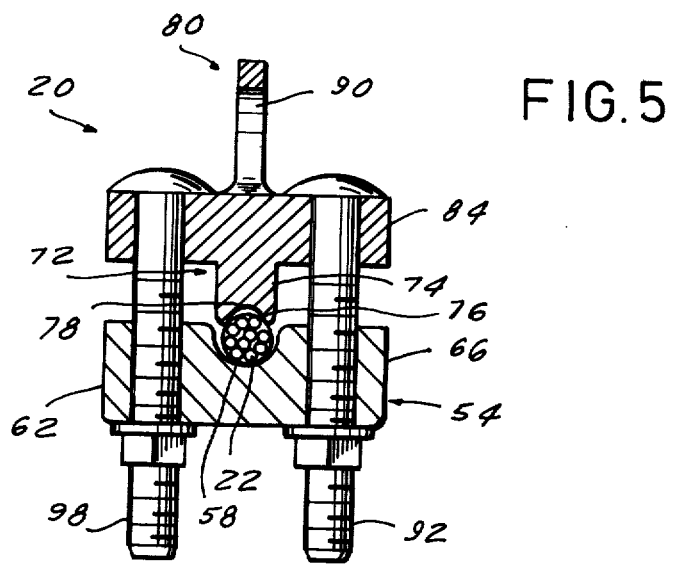
FIG. 5 is a sectional end view thereof taken along the plane of line 5—5 of FIG. 3.
Figure 3:
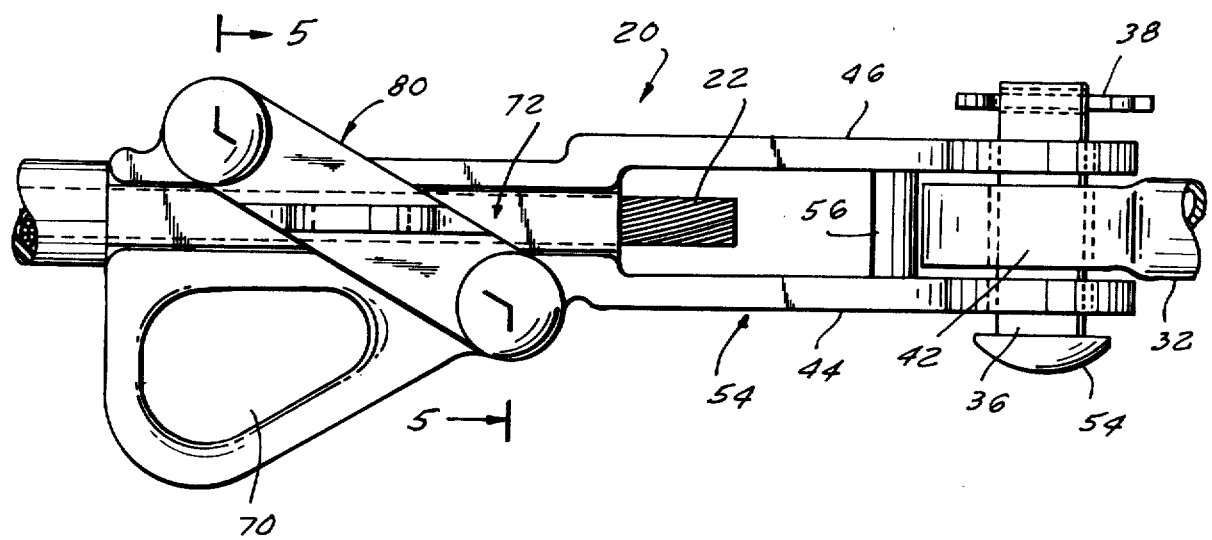
FIG. 3 is a top plan view thereon shown in position holding a portion of a transmission cable in position.
Figure 4:
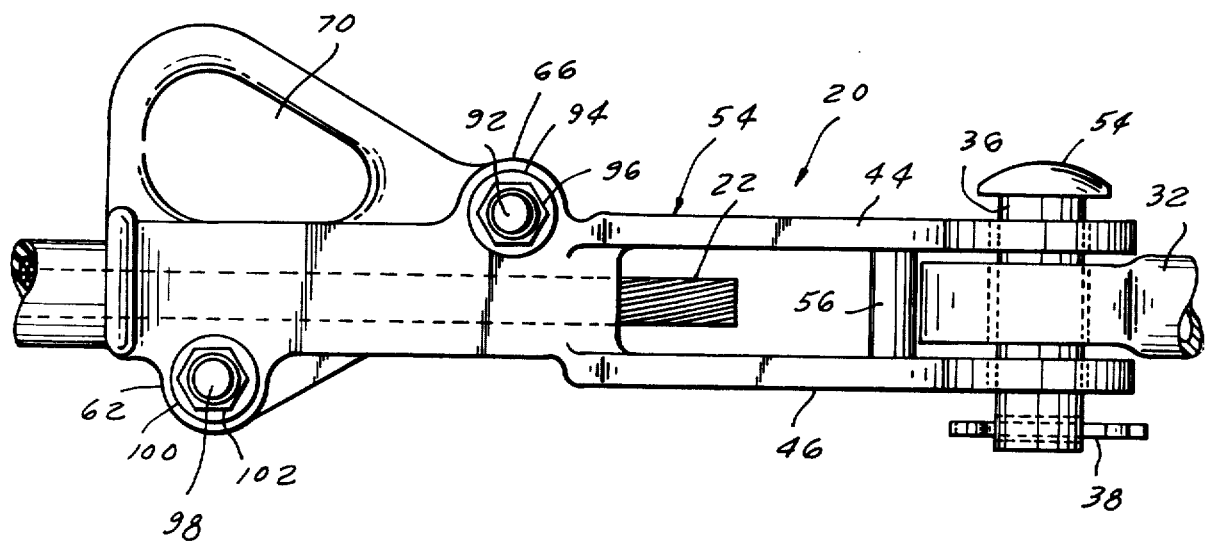
FIG. 4 is a bottom plan view thereof.
Figure 6:
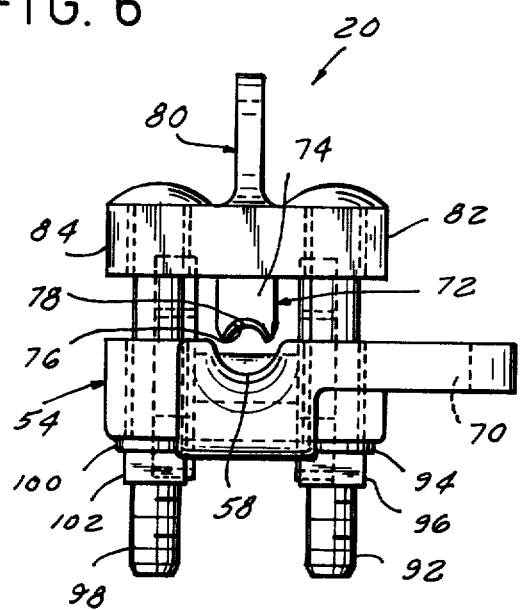
FIG. 6 is an end view of the dead end connector of the invention.
Figure 7:
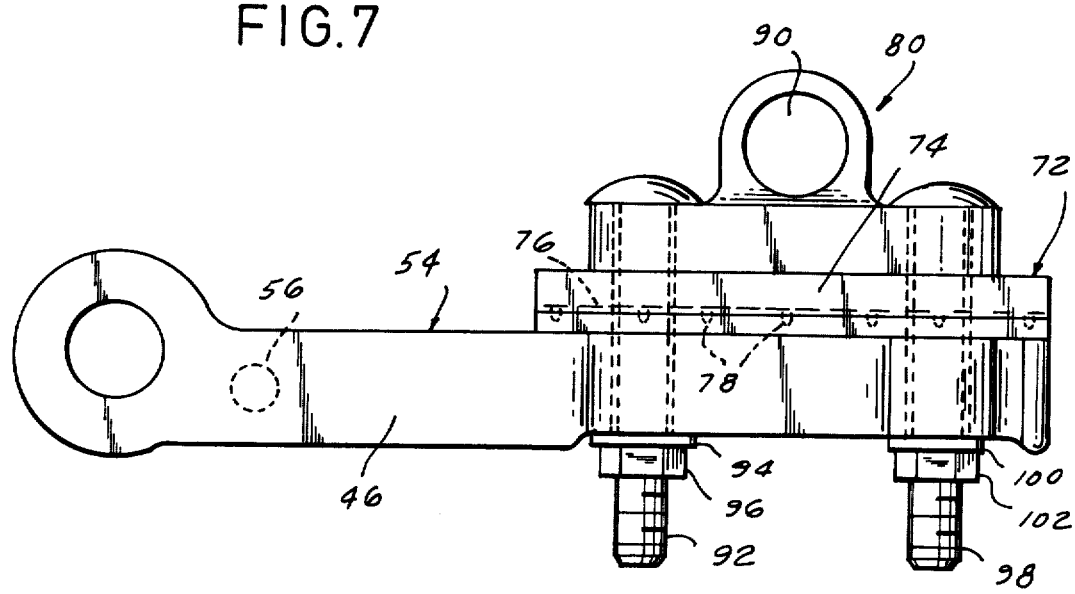
FIG. 7 is a side elevation view thereof.

Dead end connector 20 is depicted in FIG. 1 in use in connecting a transmission cable 22 to a pole 24. A conventional bracket assembly 26 is mounted to the pole and extends outwardly therefrom. Bracket 26 is commonly known as an insulated stand off bracket and has line post insulators 28 mounted thereon. Dead end insulators 30 are mounted on a pivoted bracket 32 which is pivotally connected to bracket 26 at point 34 at one end and at the other end is pivotally connected to dead end connector 20 by a conventional pivot bolt 36 held in place by a cotter pin 38, the details of which are depicted in FIG. 2.

Coter pin 38 extends through hole 40 in the end of bolt 36. Bracket 32 has an end portion 42 which fits between the legs 44 and 46 of the U-shaped end portion of connector 20. Portion 42 has a hole 48 therein which is adapted to be aligned with holes 50 and 52 in the legs 44 and 46 respectively. Thus bolt 36 can extend through aligned holes 50, 48 and 52 for engagement with cotter pin 38 through hole 40. The enlarged head 54 prevents full extension of the bolt through the openings and thus provides the pivotal coupling relationship between member 32 and dead end connector 20.

The U-shaped portion containing legs 44 and 46 form one end of body 54 of connector 20. The legs are maintained in spaced relationship by means of a spacer 56 welded or integrally formed with body 54.

The other end portion of body 54 has an elongated channel 58 in its upper surface of a large enough diameter to receive the end of transmission cable 22 therein. The surface of channel 58 is provided with a pattern of ridges in a waffle configuration to facilitate gripping of the cable and retaining it in position when connected thereto. Adjacent one end of channel 58 is a laterally extending arcuate projection 62 with a through vertical hole 64 therein. Similarly, adjacent the other end of channel 58 and on the opposite side of body 54 is a laterally extending projection 66 with a through vertical hole 68 therein. Body 54 is also provided with a laterally extending eye 70 which is a conventional piece of structure to facilitate manipulation of the body with hot line tools.

A pressure pad 72 is adapted to be removably coupled with body 54 to form connector 20. The pressure pad includes an elongated base 74 adapted to substantially conform with channel 58. The underside 76 of the base is arcuate and is provided with a plurality of ribs 78 which facilitate gripping interengagement with cable 22 in the same manner that waffle surface 60 accomplishes that function in channel 58.

A cross piece 80 is formed on the upper surface of base 74 and extends across the upper surface and laterally from both sides thereof at an oblique angle. Thus, one end portion 82 extends laterally from one side of base 74 and the other end portion 84 extends laterally from the other side of base 74. End portion 82 has a hole 86 therethrough and similarly end portion 84 has a hole 88 therethrough. When pressure pad 72 is coupled with body 54 the holes 86 and 88 become aligned with holes 68 and 64 respectively in the body. An upstanding eye 90 extends upwardly from cross piece 80 to facilitate manipulation of the pressure pad by hot line tools while making the connection by use of dead connector 20.

To complete the coupling assembly of pressure pad 72 to body 54, a pair of bolt and nut assemblies are utilized. Bolt 92 extends through hole 86 and through hole 68 to engage with washer 94 and nut 96. Similarly, bolt 98 extends through hole 88 and hole 64 into engagement with washer 100 and nut 102.

In use, as depicted in FIGS. 1-5, body 54 is coupled to member 32 in conventional fashion by means of bolt 36 and cotter pin 38. Transmission cable 22 is then inserted into channel 58 into gripping engagement with waffle surface 60. Pressure pad 72 is then coupled with body 54 by aligning base 74 with channel 58 so that the ribbed undersurface 76 of base 74 engages with cable 22 and captures the cable in position. Gripping of pressure pad 72 is facilitated by eye 90 and the fact that cross piece 80 extends upwardly from the pressure pad and upwardly from body 54 when the pressure pad is coupled therewith.

The two bolts 92 and 98 are then passed through the aligned holes and are coupled with the washers and nuts to tightly interengage pressure pad 72 with body 54 and hold cable 22 in fixed connected position.

Only two bolt assemblies are required to accomplish the coupling action and the undersurface 76 of pressure pad base 74 engages along its entire length or a substantial portion thereof with cable 22 thus distributing the force application and avoiding undue pressure at any point along the cable length that could cause bowing of the cable or damage to the cable. By distributing the force in this manner, it is possible to use a hard material for the engaging surfaces of dead end connector 20 such as cast alluminum.

The distribution of force is accomplished by the obliquely extending cross piece which forms a double cantilever structure applying a moment force which is distributed along the length of base 74. This is in contrast to a directly applied vertical force which acts only at the point of application.

There is no danger of misalignment of the cable when extended between the mating channel 54 and undersurface of base 74 and a direct pull effect is achieved. Also, a positive load is distributed along the entire engaging surface of the connector with the cable.

Naturally, disassembly can be accomplished in a quick and efficient manner with removal of the two bolt assemblies and removal of pressure pad 72 from body 54 freeing cable 22.

In the embodiment depicted in FIGS. 1-7 raised ribs are provided on both the body and pressure pad. While these ribs are incorporated in certain size dead ends, for example very large sizes, they are often not utilized in other sizes, such as very small size dead ends. In place of the ribs, a simple groove can be provided having a configuration such as a modified parabolic V groove to provide for the maximum desirable contact on each conductor.

Figure 8:
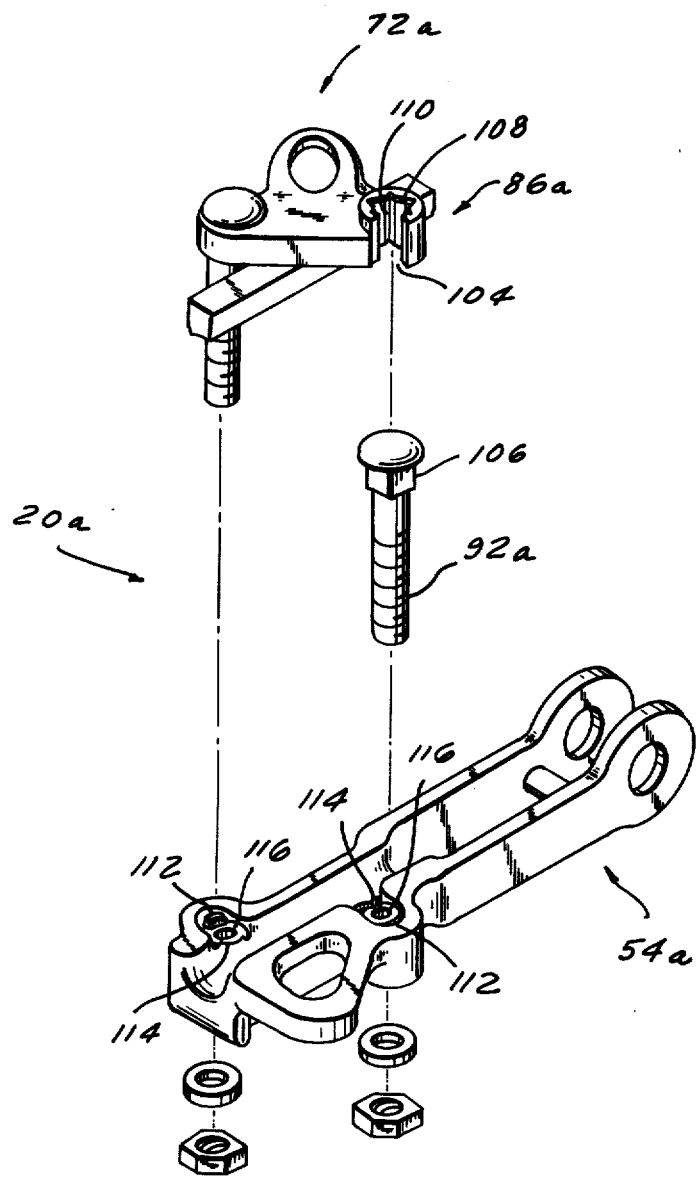
FIG. 8 is an exploded perspective view of an alternative embodiment of the dead end connector of the invention.
Figure 9:
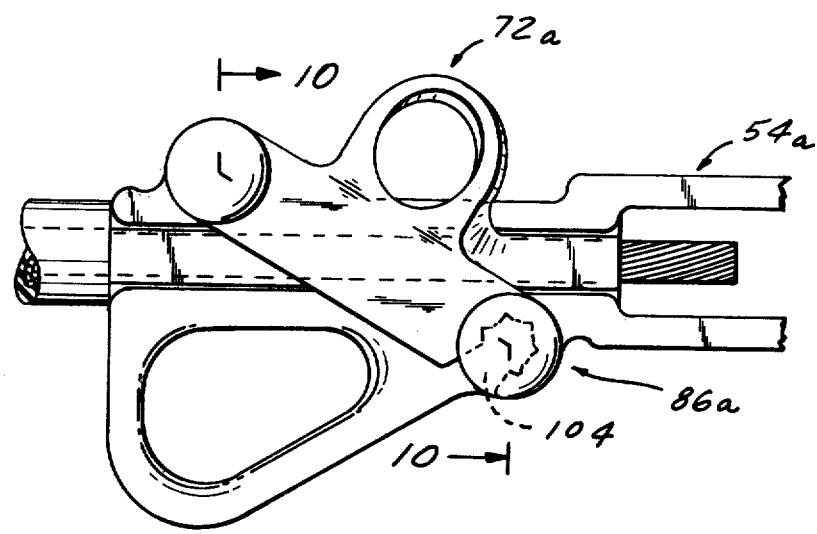
FIG. 9 is a fragmentary top plan view thereof shown in position holding a portion of a transmission cable in position.
Figure 10:
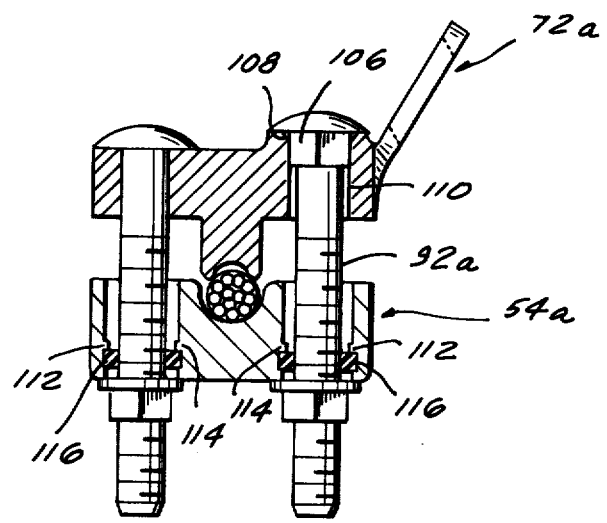
FIG. 10 is a sectional end view thereof taken along the plane of line 10—10 of FIG. 9.

A further embodiment is depicted in FIGS. 8-10 of the drawings. This form of dead end connector is particularly adaptable for use in hot stick application or where additional skinning of a covered conductor can be eliminated. Connector 20a is similar in many respects to the previously described connector, however it does have certain modifications that make it particularly adaptable as a swing-away device. The pressure pad and body portions are quite similar to that of the previously discussed embodiments and the similar components bear the same reference numeral with the addition of the subscript "a" in the embodiment of FIGS. 8-10.

Connector 20a is mounted to surrounding structure in the same manner as connector 20 as depicted in FIG. 1. The modifications in structure are on the pressure pad 72a and the body 54a of connector 20a. One difference resides in the absence of ribs in groove 74a on the underside of pressure pad 72a.

A second modification resides in the nature of end portion 82a containing hole 86a. The hole 86a is provided with a side opening 104 throughout the height of the hole. The opening is sufficiently wide enough to receive the shank of bolt 92a therethrough. In this manner, it is not necessary for the bolt to be extended into hole 86a through the top opening. Thus, the pressure pad is free to swing horizontally away from the bolt when the bolt and nut assemblies is sufficiently loosened.

It should also be noted that the top portion 106 of the shank of bolt 92a has a square configuration which is designed to meet with a lead-in chamfer 108 at the top of hole 86a and a series of vertical notches 110 spaced about the interior surface of the hole 86a. The lead-in chamfer 108 and vertical notches 110 insures that the square portion 106 of the shank of bolt 92a is guided into the hole and is locked for a single wrench operation. Otherwise, pressure pad 72a corresponds to pressure pad 72.

Turning to consideration of body 54a, it is similar to body 54 in most respects with the exception of several modifications with respect to openings 64a and 68a which receive the bolts. A pair of opposed horizontal semi-circular ribs 112 and 114 are positioned in each hole 64a and 68a. These are staggered in the vertical plane and provide a cavity for insertion of a grommet 116 which is of a common well known material such as neoprene and the like. The inner diameter of grommet 116 provides friction on the shank of each bolt to hold the bolts and the pressure pad 72a when the connector is in the open position for ease of installation. Also, the placement of each grommet 116 allows the bolts to be tightened in the normal manner without changing position and avoiding possible interference with the travel of the bolt and the pressure pad. The grommet supporting bolt 92a is the more important of the two since it holds the bolt 92a in the vertically upward position while the pressure pad 72a is rotated unto it. Since the pressure pad 72a is held during this process the grommet supporting bolt 98a is of less importance and may be omitted.

As stated above, operation of the connector 20a is similar to that of connector 20 and it is mounted to the supporting structure in the same manner as depicted in FIG. 1. Bolts 92a and 98a are utilized to couple the pressure pad 72a to the body 54a with the aid of appropriate washer and nut assemblies.

However, in making a connection, the bolt and nut assemblies need only be loosened sufficiently to permit the raising of the pressure pad out of the groove or channel 58 of the body. It should be noted that in the embodiment of FIGS. 8-10 no waffle surface is employed in the channel just as there are no ribs on the undersurface of the pressure pad. This is a matter of choice depending upon the size and type of connector being utilized as discussed above.

Once the pressure pad is free from the channel it can be swung outwardly in a horizontal direction away from alignment with the channel with bolt 92a passing through side opening 104 in hole 86a. The friction of the grommets 116 help to retain the pressure pad 72 in the open position and the bolts in position thereby facilitating ease of connection of a cable 22 to the connector. The pressure pad 72a is then swung back into alingment with the channel and bolt 92a will pass through opening 104 into hole 86 again. The chamfer surface 108 and the vertical notches 110 facilitate engagement of the square portion 106 of the bolt so that a simple single wrench operation on nut 96a will once again tighten the bolt and nut assembly and couple the pressure pad to the body completing the connection for connector 20a. The grommet 116 also assists in allowing the bolt to be tightened in the normal manner without changing position and possible interference with the travel of the bolt and the pressure pad in the tightening operation.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A dead end connector for a transmission cable comprising; an elongated body, a cable-receiving longitudinal channel formed in said body, a pressure pad, an elongated base portion on said pressure pad adapted to be aligned with the longitudinal channel of the body, a cross piece on the side of the base portion opposite to the side adjacent the channel of the body when aligned therewith, the cross piece extending across and outwardly from both sides of the aligned body and pad at an oblique angle with respect thereto, coupling means for retaining the pressure pad in overlying aligned position with respect to the channel to hold a portion of a transmission cable therein with the cross piece enabling the provision of a holding pressure along at least a substantial portion of the engagement surface of the pressure pad with the transmission cable portion, release means being provided for permitting the release of the coupling means in a manner which permits the pressure pad to swing-away horizontally from the body and expose the longitudinal channel in the body, the coupling means including a pair of bolt and nut assemblies with each bolt and nut assembly extending through aligned apertures in the cross-piece and the body so that when each assembled bolt and nut assembly is located at the opposite end of the cross-piece from the other bolt and nut assembly, and the release means including an opening in the side wall of one aperture so that when the bolt and nut assemblies passing through the apertures are at least partially released the pressure pad can be pivoted about one bolt and swung-away from the other bolt and from alignment with the channel in the body.

2. The invention in accordance with claim 1 wherein the bolt passing through the aperture with the opening in the side wall thereof has a portion of square configuration for positioning in the aperture and the aperture contains a lead-in chamfer adjacent the top of the aperture and a series of vertical notches spaced about the interior surface of the aperture so that when the aperture is swung into engagement with the square portion of the bolt it will be guided into the aperture and can be locked in a single wrench operation applied to either end of the bolt.

3. The invention in accordance with claim 1 wherein the aperture in the body containing the bolt to be attached to the pressure pad includes means for retaining a friction member therein, the friction member positioned to engage the bolt and assist in holding the bolt in position exposing the channel for ease of installation.

4. The invention in accordance with claim 3 wherein the friction member is a neoprene grommet.

5. A dead end connector for a transmission cable comprising; an elongated body, a cable-receiving longitudinal channel formed in said body, a pressure pad, an elongated base portion on said pressure pad adapted to be aligned with the longitudinal channel of the body, a cross piece on the side of the base portion opposite to the side adjacent the channel of the body when aligned therewith, the cross piece extending across and outwardly from both sides of the aligned body and pad at an oblique angle with respect thereto, coupling means for retaining the pressure pad in overlying aligned position with respect to the channel to hold a portion of a transmission cable therein with the cross piece enabling the provision of a holding pressure along at least a substantial portion of the engagement surface of the pressure pad with the transmission cable portion, and partial release means being provided on said crosspiece for permitting partial release of a first part of the coupling means in a manner which permits the pressure pad to be pivoted on the second part thereof and swung away from said partially released first part and from alignment with the channels in the body to expose the longitudinal channel without the necessity of complete disassembly of the pressure pad from the body.

* * * * *